(12) United States Patent
Jack et al.

(10) Patent No.: US 10,995,288 B2
(45) Date of Patent: May 4, 2021

(54) INTEGRATED PROCESS PLANT HAVING A BIOMASS REFORMING REACTOR USING A FLUIDIZED BED

(71) Applicant: Sundrop Fuels, Inc., Longmont, CO (US)

(72) Inventors: Douglas S. Jack, Longmont, CO (US); Renus C. Kelfkens, Longmont, CO (US); Wayne W. Simmons, Longmont, CO (US); Andrew Argo, Fort Collins, CO (US); Andrew W. Broerman, Frederick, CO (US)

(73) Assignee: Sundrop IP Holdings, LLC, Longmont, CO (US)

( * ) Notice: Subject to any disclaimer, the term of this patent is extended or adjusted under 35 U.S.C. 154(b) by 87 days.

(21) Appl. No.: 15/260,198

(22) Filed: Sep. 8, 2016

(65) Prior Publication Data
US 2017/0066983 A1    Mar. 9, 2017

Related U.S. Application Data

(60) Provisional application No. 62/216,303, filed on Sep. 9, 2015.

(51) Int. Cl.
*H01L 39/24*     (2006.01)
*C10J 3/84*      (2006.01)
(Continued)

(52) U.S. Cl.
CPC .  *C10J 3/84* (2013.01); *B01J 8/24* (2013.01); *C01B 3/24* (2013.01); *C01B 3/26* (2013.01);
(Continued)

(58) Field of Classification Search
CPC .......................... H01L 39/2487; H01L 39/141
See application file for complete search history.

(56) References Cited

U.S. PATENT DOCUMENTS 3,910,834 A  *  10/1975  Anderson ............... C10G 45/18
                                                    208/108
4,260,475 A  *   4/1981  Scott ........................ B01J 21/20
                                                    208/113
(Continued)

OTHER PUBLICATIONS

International Search Report and Written Opinion filed in International Patent Application No. PCT/US2016/050950 dated Nov. 28, 2016, 13 pages.

*Primary Examiner* — Paul A Wartalowicz
(74) *Attorney, Agent, or Firm* — Rutan & Tucker, LLP

(57) ABSTRACT

An interconnected set of two or more stages of reactors to form a bio-reforming reactor that generates syngas for a number of different liquid fuel or chemical processes is discussed. A first stage includes a circulating fluidized bed reactor that is configured to cause a chemical devolatilization of the biomass into its reaction products of constituent gases, tars, chars, and other components, which exit through a reactor output from the first stage. A second stage of the bio-reforming reactor has an input configured to receive a stream of some of the reaction products that includes the constituent gases and at least some of the tars as raw syngas, and then chemically reacts the raw syngas within a vessel of the second stage to make the raw syngas from the first stage into a chemical grade syngas by further cracking the tars, excess methane, or both.

7 Claims, 7 Drawing Sheets

(51) Int. Cl.
   *C01B 3/26* (2006.01)
   *B01J 8/24* (2006.01)
   *C01B 3/24* (2006.01)
   *C10J 3/56* (2006.01)

(52) U.S. Cl.
   CPC ......... *C10J 3/56* (2013.01); *C01B 2203/0233* (2013.01); *C01B 2203/0272* (2013.01); *C01B 2203/0277* (2013.01); *C01B 2203/04* (2013.01); *C01B 2203/048* (2013.01); *C01B 2203/0465* (2013.01); *C01B 2203/0475* (2013.01); *C01B 2203/0485* (2013.01); *C01B 2203/0495* (2013.01); *C01B 2203/061* (2013.01); *C01B 2203/062* (2013.01); *C01B 2203/0816* (2013.01); *C01B 2203/1041* (2013.01); *C01B 2203/1058* (2013.01); *C01B 2203/1241* (2013.01); *C01B 2203/1247* (2013.01); *C01B 2203/1252* (2013.01); *C01B 2203/1258* (2013.01); *C01B 2203/1676* (2013.01); *C10J 2200/15* (2013.01); *C10J 2300/0906* (2013.01); *C10J 2300/0909* (2013.01); *C10J 2300/0916* (2013.01); *C10J 2300/0976* (2013.01); *C10J 2300/0993* (2013.01); *C10J 2300/12* (2013.01); *C10J 2300/1253* (2013.01); *C10J 2300/1659* (2013.01); *C10J 2300/1665* (2013.01); *C10J 2300/1853* (2013.01); *Y02E 50/30* (2013.01); *Y02P 20/10* (2015.11); *Y02P 20/145* (2015.11)

(56) References Cited

U.S. PATENT DOCUMENTS

| | | | | |
|---|---|---|---|---|
| 4,556,479 | A | * 12/1985 | Mauleon | C10G 11/182 208/161 |
| 5,092,984 | A | * 3/1992 | Babu | C10G 1/02 201/31 |
| 5,562,744 | A | * 10/1996 | R as anen | B01J 8/1827 48/197 R |
| 6,355,221 | B1 | * 3/2002 | Rappas | C01B 7/192 423/158 |
| 6,814,940 | B1 | 11/2004 | Hiltunen et al. | |
| 6,916,416 | B2 | 7/2005 | Adamson et al. | |
| 7,943,014 | B2 | 5/2011 | Berruti et al. | |
| 8,920,736 | B2 | 12/2014 | Liu | |
| 2004/0182000 | A1 | * 9/2004 | Mansour | C01B 3/344 48/197 FM |
| 2010/0273899 | A1 | 10/2010 | Winter | |
| 2014/0256994 | A1 | * 9/2014 | Iaquaniello | C01B 3/386 568/910.5 |
| 2016/0130408 | A1 | * 5/2016 | Jansen | C08H 6/00 514/777 |

* cited by examiner

```
                    ┌─────────┐
                    │  Start  │
                    └────┬────┘
                         ▼
```

| forming a bio reforming reactor with an interconnected set of two or more stages of reactors that generate syngas for any of 1) a methanol synthesis reactor, 2) a Methanol to Gasoline reactor train process, 3) a high temperature Fischer-Tropsch reactor train, that use the syngas derived from biomass in the bio reforming reactor |
|---|
| 502 |

| causing, in the first stage, a chemical devolatilization of the biomass into its reaction products of constituent gases, tars, chars, and other components, which exit through a reactor output from the first stage |
|---|
| 504 |

| the circulating fluidized bed has different velocities flowing through the vessel in multiple sections making up the circulating fluidized bed reactor, which causes turbulence for the biomass flowing with the circulating solid media |
|---|
| 506 |

| injecting high pressure steam at a velocity of about 2 feet/second and the high-pressure steam is between 50 to 300 PSI with the sparger at a bottom of the vessel |
|---|
| 508 |

| the steam from the sparger, superheated fluidization gases, and a stream of the heat absorbing media from the one or more stream inputs both gasify and push up falling chunks and particles of the biomass upward in the vessel, where the high temperature and high-pressure of the steam and the heat absorbing media starts the devolatizing of the biomass, which causes localized turbulent flow of gases around each biomass chunk, |
|---|
| 510 |

Fig. 5A                Cont.

```
                              ┌──────┐
                              │ Cont.│
                              └──┬───┘
                                 ▼
``` an example velocity flow of the biomass in the mixing pot section is between 2-6 feet/second in the circulating fluidized bed reactor based on a shape and dimensions of the vessel, an example velocity flow of the biomass and its devolatilized gases and solids at a start of the necking transition section is up to 5-8 feet per second based on the shape and dimensions of the vessel in this section, and an example velocity flow of the biomass and its devolatilized gases and solids at an exit of the riser section is greater than 15 feet per second based on the shape and dimensions of the vessel in this section.

512 the circulating fluidized bed reactor has multiple sections forming a shape and an operation of the circulating fluidized bed reactor, where the circulating fluidized bed gasifier has the sparger to distribute high-temperature and high-pressure steam in a bottom section of the circulating fluidized bed reactor, where the circulating fluidized bed reactor is configured to operate in a temperature regime from 750 C to 1000 C and an operating pressure is configured to be from 20 psig up to 300 psig. In another example, superficial gas velocities in a top riser section are configured to be greater than 19 feet/second based on a shape and dimensions in this section of the vessel while the velocities in a mixing pot section will range from 2-6 feet/second based on a shape and dimensions in this section of the vessel, where the mixing pot section is located between the bottom section and top riser section, where the steam from any of the sparger, the stream inputs for the heat absorbing media, and the supply inputs for the biomass combine to reform the biomass at total steam to biomass ratio ranging from 0.25:1 up to 1:1.

514 the angular necking section of the circulating fluidized bed reactor reflects and turns some of the heat absorbing media, gases, and not fully-decomposed solid biomass on outside edges of the necking section back down into the circulating fluidized bed in the mixing pot section, which causes more turbulence as well as a better distribution of the biomass inside the vessel, where an angle of the necking section from the mixing pot section to the riser section controls an amount of turbulence with the reflected back heat absorbing media, gases, and not fully decomposed solid biomass into the mixing pot section portion of the vessel, and
    an internal portion of the vessel has one or more additional internal mixing baffles to assist with mixing of the heat absorbing media and biomass.

| receiving the raw syngas stream in a primary cyclone coupled the reactor output from the first stage in a riser section of the circulating fluidized bed reactor, where the primary cyclone is heavily loaded to operate at very high filtering efficiency in excess of 99%, where the primary cyclone that is very efficient in separating solid particles including char and the solid circulating heat absorbing media routes the solid particles toward the char combustor, and routes gases from the stream of the reaction products toward the input of the second stage of the bio reforming reactor.   518 |
|---|

| receiving the raw syngas stream in a densely packed moving bed of olivine or dolomite, which is configured to act as both a dust filter and a tar destroyer from the raw syngas from the reactor output of the first stage, where the densely packed moving bed is coupled to a gaseous output of a primary cyclone coupled to the reactor output of the first stage, where the moving bed is configured to operate adiabatically at 800 C to 950 C temperature, where tars heavier than benzene are chemically broken down into constituent gas in the raw syngas in order to protect any downstream components from coating with soot.   520 |
|---|

| receiving a stream of the reaction products that includes the constituent gases and at least some of the tars as raw syngas in a second stage of the bio reforming reactor; and then, chemically reacting the raw syngas within a vessel of the second stage to make the raw syngas from the first stage into a chemical grade syngas by further cracking the tars, excess methane, or both into their constituent molecules so that a resultant syngas stream going out a reactor output of the second stage can be used in other chemical reactions rather than just being a source of fuel for burning.   522 |
|---|

| receiving the raw syngas stream in a catalytic reactor in the second stage to remove a substantial amount of tars and methane remaining in the raw syngas, where the catalytic reactor reacts with the raw syngas to create a resultant chemical grade synthesis gas that is substantially tar-free, less than 5 ppm total tars including benzene and naphthalene, and with a methane content no higher than 2% (dry basis).   524 |
|---|

| The downstream integrated plant production components receive the generated chemical grade syngas derived from biomass in the bio-reforming reactor for use in any of 1) a methanol synthesis reactor, 2) a Methanol to Gasoline reactor train process, 3) a high temperature Fischer-Tropsch reactor train, or 4) other Chemical production process.   526 |
|---|

Fig. 5C      End

INTEGRATED PROCESS PLANT HAVING A BIOMASS REFORMING REACTOR USING A FLUIDIZED BED

RELATED APPLICATIONS

This application claims priority to U.S. Provisional Patent Application Ser. No. 62/216,303, titled, "An Integrated Process Plant Having a Biomass Reforming Reactor Using a Fluidized Bed," filed Sep. 9, 2015, and incorporates its contents in their entirety by reference.

FIELD

The design generally relates to an Integrated Process Plant having a biomass gasifier using a fluidized bed.

BACKGROUND

To achieve high conversion and selectivity, some biomass gasification requires temperatures in excess of 1000° C. These temperatures are difficult to achieve in some standard fluidized bed gasifiers, because higher temperatures require combustion of an ever larger portion of the biomass itself or the need for excessive supplemental fuel. As a result, indirect and fluidized bed gasification is typically limited to temperatures of 800° C. At these temperatures, production of unwanted higher hydrocarbons (tars) is significant without the addition of additional catalyst to crack these tars. These tars clog up downstream equipment and foul/deactivate catalyst surfaces, requiring significant capital investment (10-30% of total plant cost) in tar removal equipment.

SUMMARY

An integrated plant is discussed that includes a steam expansion/explosion unit, a bio-reforming reactor consisting of two or more stages to generate syngas from biomass from the steam explosion unit, and any of a methanol synthesis reactor, a Methanol to Gasoline reactor train process, a high temperature Fischer-Tropsch reactor train, or another chemical process that uses the reaction syngas product derived from the biomass in the bio-reforming reactor.

In an embodiment, the integrated plant has an interconnected set of two or more stages. An example first stage reactor is meant to cause the devolatilization of woody biomass into its constituent gases, tars, chars, and other components. The second stage reactor is meant to perform further clean up of the syngas to make the raw syngas from the first stage into chemical grade syngas by further cracking the tars and/or excess methane into their constituent molecules so that the resultant syngas stream can be used in other chemical reactions rather than just being a source of fuel for burning. The first stage reactor may include a circulating fluidized bed reactor that circulates a heat absorbing media such as silica sand, olivine or other active media. The second stage reactor may contain a radiant heat reactor that either operates at a high enough temperature such that no catalyst is needed to decompose the tars and excess methane in the syngas stream or operates with a catalyst at a lower temperature and then occasionally rejuvenates the catalyst in the second stage.

BRIEF DESCRIPTION OF THE DRAWINGS

The multiple drawings refer to the example embodiments of the design.

FIGS. 5A-5C illustrate flow diagrams of an embodiment of a bio-reforming reactor configured to generate chemicals, such as chemical grade syngas and liquid transportation fuels, in an integrated plant.

Figure 1:
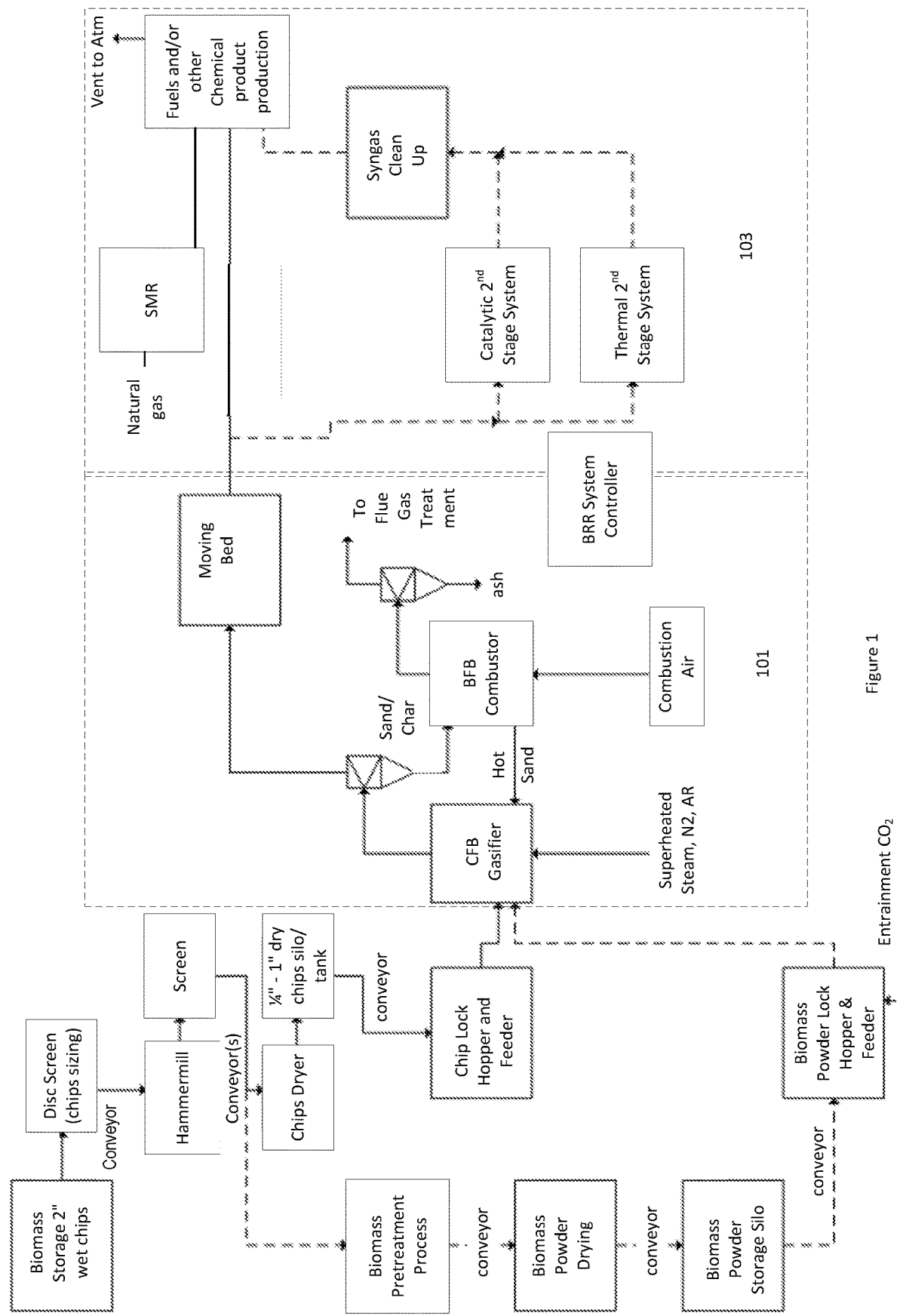
FIG. 1 illustrates a diagram of an embodiment of integrated plant with an interconnected set of two or more stages of reactors to form a bio-reforming reactor that generates syngas.

While the design is subject to various modifications and alternative forms, specific embodiments thereof have been shown by way of example in the drawings and will herein be described in detail. The design should be understood to not be limited to the particular forms disclosed, but on the contrary, the intention is to cover all modifications, equivalents, and alternatives falling within the spirit and scope of the design.

DETAILED DISCUSSION

In the following description, numerous specific details are set forth, such as examples of specific chemicals, named components, connections, types of heat sources, specific numeric values given for an example design, etc., in order to provide a thorough understanding of the present design. It will be apparent, however, to one skilled in the art that the present design may be practiced without these specific details. In other instances, well known components or methods have not been described in detail but rather in a block diagram in order to avoid unnecessarily obscuring the present design. Further, specific numeric references such as first reactor, can be made. However, the specific numeric reference should not be interpreted as a literal sequential order but rather interpreted that the first reactor is different than a second reactor. Thus, the specific details set forth are merely exemplary. The specific details can be varied from and still be contemplated to be within the spirit and scope of the present design. The term coupled is defined as meaning connected either directly to the component or indirectly to the component through another component. Concepts discussed for a first embodiment may be implemented in another embodiment where that is logically possible.

In general, a number of example processes for and apparatuses associated with a biomass conversion to a chemical grade syngas are described. The following drawings and text describe various example implementations for an integrated plant.

FIG. 1 illustrates a diagram of an embodiment of integrated plant with an interconnected set of two or more stages of reactors to form a bio-reforming reactor that generates syngas.

The integrated plant may have an interconnected set of two or more stages 101, 103 of reactors. An example first stage reactor 101 is meant to cause the devolatilization of woody biomass into its constituent gases, tars, chars, ash, and other components. Devolatilization of woody biomass occurs by chemically bio-reforming or decomposing the biomass via a gasification of a steam-based reaction where the steam, as the oxidant, at a given temperature chemically decomposes the complex chains of molecules of the biomass into smaller molecules composed of 1) solids, such as char (unreacted carbon and ash), as well as 2) gases, such as hydrogen (H2), carbon monoxide (CO), carbon dioxide CO2, methane (CH4), etc. Thus, a decomposition reaction of the biomass through steam gasification occurs chemically, which may be referred to as bio-reforming. The second stage 103 of the reactor is meant to perform further clean up the syngas to make the raw syngas from the first stage 101 into chemical grade syngas by further cracking the tars and/or excess methane into their constituent molecules so that the resultant syngas stream can be used in other chemical reactions rather than just being a source of fuel for burning.

The integrated plant starting from biomass (dried or not dried) may feed a two-stage bio-reforming reactor (BRR) 101, 103. The bio-reforming reactor produces a chemical grade syngas to produce fuels or other chemicals such as Methanol (MEOH), Methanol to Gasoline (MTG), High Temperature Fischer Tropsch process (HTFT), Low Temperature Fischer Tropsch process (LTFT), etc. A Steam Methane Reactor may or may not be included with the integrated plant in order to supply extra hydrogen when combined with the syngas from the bio-reforming reactor. Biomass could be any non-food source biomass such as wood, sugarcane, bamboo, sawgrass, bagasse, palm empty fruit basket, corn stover, etc. In an embodiment, a low sulfur content woody biomass is chosen as the source biomass. In an embodiment, a combination of these biomass sources is chosen as can be supplied locally to the integrated plant.

The biomass feed system is configured to supply the biomass to one or more supply inputs into the circulating fluidized bed reactor in the first stage 101. The biomass feed system further includes any of 1) a rotary valve associated with a pressurized lock hopper system, 2) a rotary valve from a non-pressurized hopper, 3) a screw feeder system, or 4) combination of the above. A variety of sizes of the biomass such as dimensions of small fine particles, less than 500 microns, and/or chunks, such as an ¾ inch or half-inch or ¼ inch long chip of wood, and may be fed by the above variety of feeding mechanisms (e.g. a screw-type feeding mechanism, a lock hopper mechanism, etc.).

The biomass feed system supplies the biomass across a pressure boundary from atmospheric to above the operating pressure within the circulating fluidized bed reactor in the first stage 101. High pressure steam and gravity are used to supply the biomass through the one or more supply inputs across and out into the vessel of the circulating fluidized bed reactor to prevent backpressure on the biomass feed system and obtain better mixing throughout the vessel.

A first stage 101 of the bio-reforming reactor may include a circulating fluidized bed reactor that has one or more supply inputs to feed the biomass from the biomass feed system, one or more stream inputs to feed heat absorbing media, a vessel to circulate the heat absorbing media, and has a sparger to input steam. The heat absorbing media may include silica sand, ilmenite, olivine, dolomite, zeolite catalysts, and any combination of the five. In general, the biomass, steam, and heat absorbing media circulate in the vessel/fluidized bed of the reactor. The first stage 101 is configured to cause a chemical devolatilization of the biomass into its reaction products of constituent gases, tars, chars, and other components, which exit through a reactor output from the first stage 101.

The first stage 101 includes the circulating fluidized bed reactor coupled with a char combustor. Hot heat absorbing media for fluidization (e.g. the silica sand or olivine) may be circulated between the circulating fluidized bed gasifier and the char combustor, providing most of the necessary heat to gasify the incoming biomass and utilizing the char produced in the circulating fluidized bed reactor. The char combustor could be a bubbling fluidized bed or as a circulating fluidized bed (riser configuration). The char combustor is configured to heat and supply the circulating heat absorbing media to the one or more stream inputs into the circulating fluidized bed reactor. The reactor output from the first stage 101 couples to a primary cyclone and dipleg that has an outlet to the bubbling fluidized bed char combustor. The char combustor may or may not have supplemental fuel added in the form of natural gas, propane, fuel gas, torch oil, kerosene, or additional biomass. The operating temperature of the char combustor will be about 100-150 C above the temperature of the circulating fluidized bed reformer. The char combustor will have an outlet (return to the circulating fluidized bed reformer) for the circulating media either through a first stage 101 cyclone in the case of the circulating fluidized bed combustor or an overflow (or underflow) port to a standpipe in the case of the bubbling bed combustor configuration.

The second stage reactor 103 of the bio-reforming reactor may contain a radiant heat reactor that either 1) operates at a high enough temperature such that no catalyst is needed to decompose the tars and excess methane in the syngas stream or 2) operates with a catalyst at a lower temperature and then occasionally rejuvenates the catalyst in the second stage 103.

The second stage 103 of the bio-reforming reactor has an input configured to receive a stream of some of the reaction products that includes 1) the constituent gases and 2) at least some of the tars as raw syngas, and then chemically reacts the raw syngas within a vessel of the second stage 103 to make the raw syngas from the first stage 101 into a chemical grade syngas by further cracking the tars, excess methane, or both into their constituent molecules so that a resultant syngas stream going out a reactor output of the second stage 103 can be used in other chemical reactions rather than just being a source of fuel for burning.

In an embodiment, the catalytic reactor in the second stage 103 removes a substantial amount of tars and methane remaining in the raw syngas. The catalytic reactor reacts with the raw syngas to create a resultant chemical grade synthesis gas that is substantially tar-free, (less than 100 ppm total tars including benzene and naphthalene and more likely less than 5 ppm) and with a methane content as low as 0.5%% (dry basis) and certainly no higher than 10% (dry basis).

Going back to stage 1, a candle filter or moving bed may be an exit component from stage 1 or an entry component into stage 2. The syngas from stage 1 may be sent to either a candle filter, which could operate as high as 900 C; a secondary cyclone for dust removal; or to a packed or moving bed of, for example, olivine, ilmenite, or dolomite, which could act as both a filter and a tar destroyer. If syngas from stage 1 goes through the candle filter, the integrated plant may still pass syngas to the olivine or dolomite bed for tar destruction.

The interconnected set of two or more stages of reactors 101, 103 form a bio-reforming reactor that generates syngas for any of 1) a methanol synthesis reactor, 2) a Methanol to Gasoline reactor train process, 3) a high temperature Fischer-Tropsch reactor train, 4) another transportation fuel process, and 5) any combination of these, that use syngas derived from biomass in the bio-reforming reactor.

Figure 2:
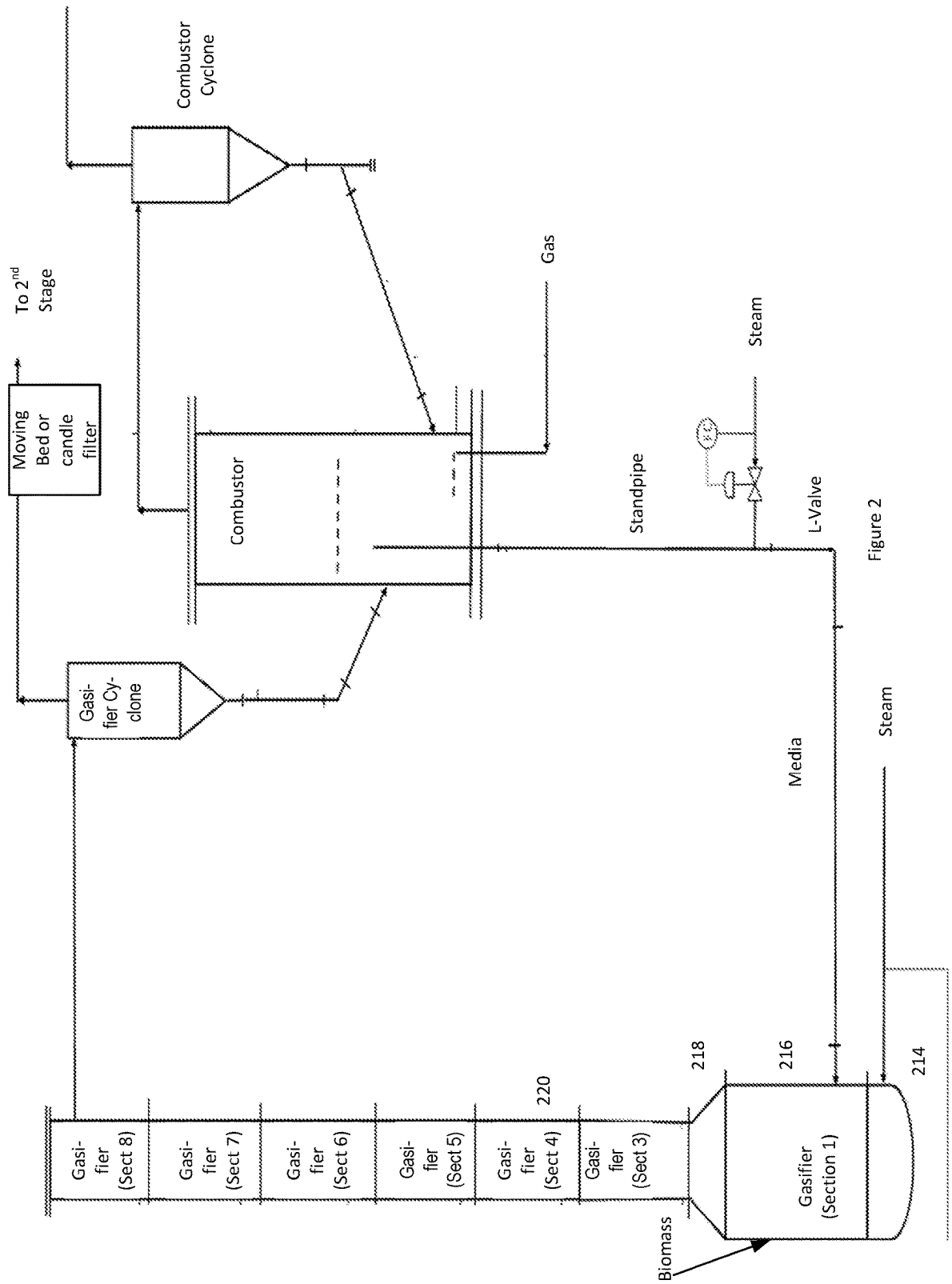
FIG. 2 illustrates a diagram of an embodiment of the first stage reactor including the circulating fluidized bed reactor coupled with a char combustor.

FIG. 2 illustrates a diagram of an embodiment of the first stage reactor including the circulating fluidized bed reactor coupled with a char combustor.

The circulating fluidized bed reactor has multiple sections forming a shape and an operation of the circulating fluidized bed reactor. The circulating fluidized bed reactor may have a bottom section 214 and a mixing pot section 216 of the vessel that are cylindrical in shape. The mixing pot section 216 then comes up to a necking portion 218 of the vessel that is smaller in diameter than the mixing pot section 216. The necking portion 218 then goes to a top riser section 220, which includes the reactor output of the first stage. In an embodiment, the cylindrical shaped bottom section 214 of the vessel to the necking portion 218 forms a mixing pot section 216 with circumference and/or width dimensions that are substantially greater than the circumference of the riser section 220. The bottom section 214 has the sparger to distribute high-temperature and high-pressure steam in the circulating fluidized bed reactor. The sparger is located at or near the bottom of the vessel. The high-temperature and high-pressure steam from the sparger may supply some of the energy needed to decompose the biomass as well as create an upward force to carry the biomass and circulating heat-absorbing media up through the vessel.

In an embodiment, the sparger cooperates with an associated bubble breaker, such as cross hatched metal, to make smaller bubbles of gas to better carry the solids of the circulating media and biomass upward. The bubble breakers also prevent slugging and provide smoother circulation.

The one or more supply inputs feed the biomass supply biomass chunks and/or particles at a higher pressure than in the vessel in order to distribute the biomass downward and across the vessel. The higher injection pressure and gravity cause the biomass chunks to be injected in the vessel. As a counter force, the steam from the sparger, superheated fluidization gases (steam, N2, Argon), and a stream of the heat absorbing media from the one or more stream inputs both gasify and push up falling chunks and particles of the biomass upward and in a radial direction in the vessel. The velocity of the steam, media, and gases as well as the pressure pushes up the falling chunks and particles of biomass upward into the circulating fluidized bed reactor vessel. Using the latent heat provided by the steam, media, and gases, the biomass is converted to syngas by a decomposition reaction with steam as the chunks or particles of biomass rise in the circulating fluidized bed gasifier. The high temperature and high-pressure of the steam and the heat absorbing media starts the devolatizing of the biomass, which causes localized turbulent flow of gases around each biomass chunk. The turbulent flow of gases creates better mixing and better reaction with the injected biomass.

The circulating fluidized bed may have different velocities flowing through the vessel, which also causes a good amount of turbulence for the biomass flowing with the circulating solid media. The velocity of the biomass flowing increases as the size of the chunk of biomass decreases via the decomposition of its larger complex molecules into smaller solid molecules and gaseous molecules. The devolatilization and decomposition of the biomass substantially increases the gas volume and therefore gas velocity of the system.

In an embodiment, the velocity flow of the biomass and/or heat absorbing media in the bottom section 216 is 2-3 feet/second. The velocity flow of the biomass and/or heat absorbing media in the mixing pot section 216 is between 2-6 feet/second in the circulating fluidized bed reactor based on a shape and dimensions of the vessel. The velocity flow of the biomass and its devolatilized gases and solids at a start of the necking transition section is up to 5-10 feet per second based on the shape and dimensions of the vessel in this section. The velocity flow of the biomass and its devolatilized gases and solids at the start of the necking transition section may be, for example, 6 feet per second. The velocity flow of the biomass and its devolatilized gases and solids within the riser section 220 speeds up to 10-20 feet per second. The velocity flow of the biomass and its devolatilized gases and solids at an exit of the riser section 220 is greater than 15 feet per second, and typically 20 feet per second, based on the shape and dimensions of the vessel in this section.

The velocity flows in the riser section 220 have a residence time of 1-2 seconds do to a rate of the velocity flow of the biomass and its devolatilized gases and solids, and the heat absorbing media; and, the designed dimensions and shape of the riser section 220. The lower velocities and bigger volume of the mixing pot section 216 allow for an on average residence time of 2-3 seconds within the mixing pot section 216 do to a rate of the velocity flow of the biomass and its devolatilized gases and solids, and the heat absorbing media; and, the designed dimensions and shape of the mixing pot section 216. This residence time is significantly longer than prior techniques. The longer residence time creates better mixing of the chunks of biomass with the circulating media to chemically react and decompose the biomass into its constituent solids and gases. Additionally, some chemical reactions need a longer chemical reaction time to assist in the prevention of forming of certain tars. Also, the longer residence time assists in increasing the yield of fully converting the woody biomass into its constituent solids, such as C (ash), and gases such as CO, CO2, CH4, and H2.

The angular necking section 218 of the circulating fluidized bed reactor reflects and turns some of the heat absorbing media, gases, and not fully-decomposed solid biomass on outside edges of the necking section 218 back down into the circulating fluidized bed in the mixing pot section 216, which causes more turbulence as well as a better distribution of the biomass inside the vessel. Note, an angle of the necking section 218 from the mixing pot section 216 to the riser section 220 controls an amount of turbulence with the reflected back heat absorbing media, gases, and not fully decomposed solid biomass into the mixing pot section 216 portion of the vessel. The more turbulence the better the mixing of the heat absorbing media and biomass, as well as a better distribution of the biomass throughout all of the circulating media in the lower portions of the circulating fluidized bed reactor vessel. The ratio of circulating media to biomass feed will be, for example, on the order of 20:1 up to 60:1 depending on operating objectives (desired reaction temperature, product slate, type and moisture content of biomass, temperature of incoming sand or olivine, etc.).

Figure 3:
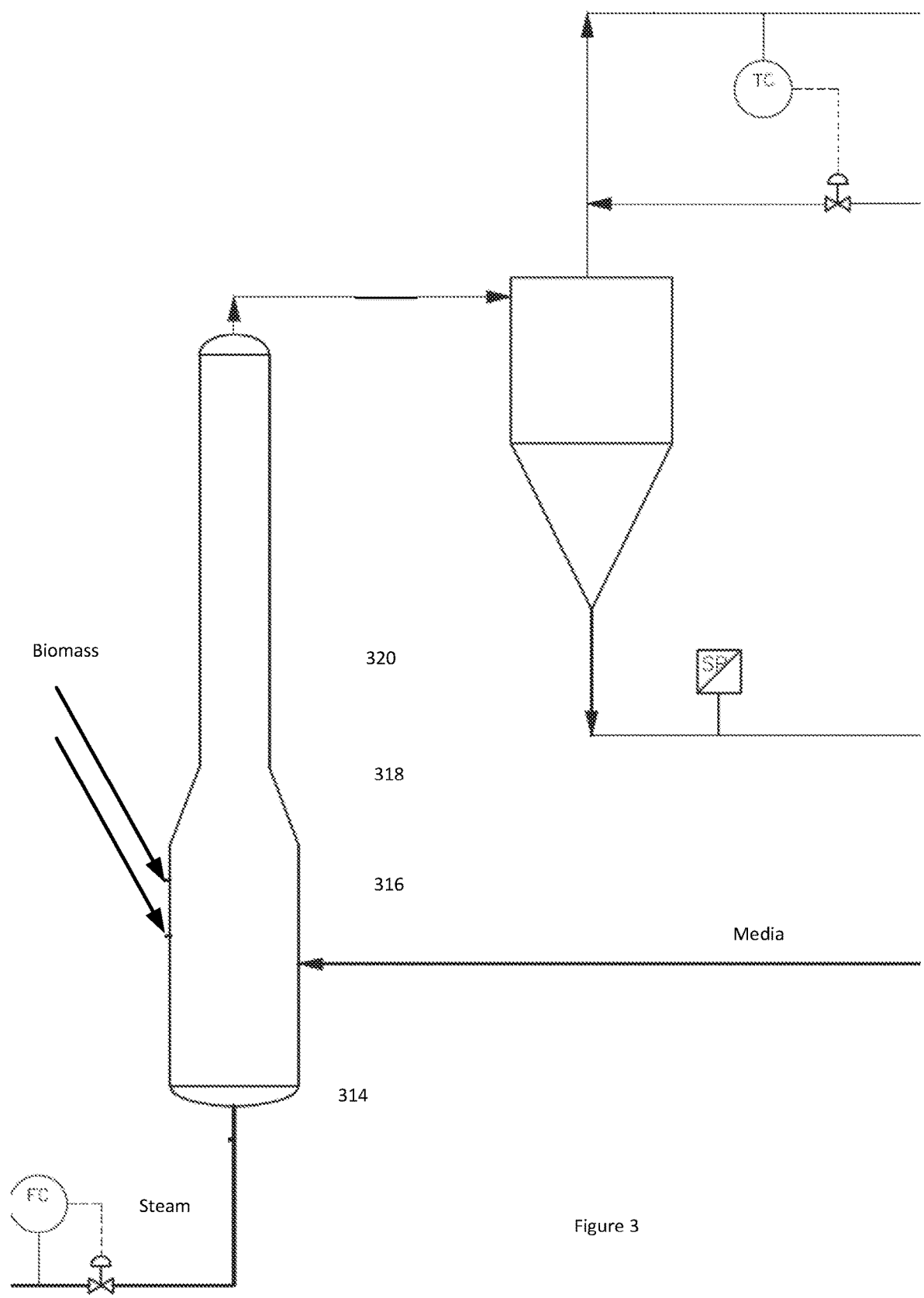
FIG. 3 illustrates a diagram of an embodiment of the circulating fluidized bed reactor having multiple sections that form a shape and an operation of the circulating fluidized bed reactor.

Note, example different shapes and angles of the vessel of the reactor are shown in FIGS. 2 and 3. The shown shapes and angles of the CFB reactor in FIGS. 2 and 3 are examples of the types of shapes and angles associated with portions of the vessel.

As discussed, the circulating fluidized bed reformer may have lower velocities at the bottom section 214 of the reactor, near the feed inlet, provided primarily by steam (and perhaps supplemental recycled syngas or CO2) and will quickly rise as the woody biomass reacts and/or changes are made to the reactor diameter. The circulating fluidized bed reformer also may or may not contain internals intended to help with smoother fluidization and better mixing of the incoming sand or olivine and biomass. In an embodiment, an internal portion of the vessel does have the one or more internal mixing baffles to assist with mixing of the heat absorbing media and biomass. Note, in the bubbling fluid bed version of the combustor internal mixing baffles may also be used.

As discussed, the circulating fluidized bed reactor has multiple sections forming a shape and an operation of the circulating fluidized bed reactor. The circulating fluidized bed gasifier has the sparger to distribute high-temperature and high-pressure steam in a bottom section 214 of the circulating fluidized bed reactor. The circulating fluidized bed reactor is configured to operate in a temperature regime from 750 degrees C. to 1000 C and an operating pressure is configured to be from 20 pounds per square inch up to 300 pounds per square inch with a typical value of 125 pounds per square inch. The steam and heated heat absorbing media create this operating temperature in the vessel, which can also be supplemented with an external heat source such as a gas-fired burner coupled to the vessel. The reason for the ranges of the operating conditions for the circulating fluidized bed reactor are biomass type, ash fusion temperature, yield patterns, and downstream performance requirements.

In another example embodiment, the superficial gas velocities in a top riser section 220 are configured to be greater than 19 feet/second based on a shape and dimensions in this section of the vessel while the velocities in a mixing pot section 216 will range from 2-6 feet/second based on a shape and dimensions in this section of the vessel. The mixing pot section 216 is located between the bottom section 214 and top riser section 220. The steam from any of 1) the sparger, 2) the stream inputs for the heat absorbing media, and 3) the supply inputs for the biomass combine to reform the biomass at total steam to biomass ratio ranging from 0.25:1 up to 1:1. The actual value will depend upon the biomass, its moisture content and operating objectives (yields, etc.). The steam and hot solid media reform the biomass in the circulating fluidized bed gasifier.

In the riser section 220, raw syngas including tars and methane, unreacted portions of solid biomass, ash from reacted portions of the biomass, and circulating media exit the riser section 220 of the circulating fluidized bed reactor.

The primary cyclone is coupled to the reactor output from the first stage in a riser section 220 of the circulating fluidized bed reactor. The top necking portion 218 of the circulating fluidized bed feeds into a top riser section 220 that then feeds into a primary cyclone that is very efficient, 99.99% efficiency at removing solid particles and pieces from the syngas. The primary cyclone is heavily loaded to operate at very high solids recovery efficiency in excess of 99%, and in most cases greater than 99.9%. In an embodiment, the cyclone has an efficiency 99.995%. The primary cyclone that is very efficient in separating solid particles including char and the solid circulating heat absorbing media routes the solid particles toward the char combustor. The primary cyclone also routes gases from the stream of the reaction products toward the input of the second stage of the bio-reforming reactor. Thus, the output of the top portion of the primary cyclone is raw syngas that is fed to the second stage. The output of the bottom portion of the primary cyclone is solid particles and pieces fed to the char combustor. Gravity pulls the solid particles and pieces, including heat absorbing media, ash, char, and other solids, down from the bottom of the primary cyclone through a loop seal into the char combustor.

Note, the char of the biomass, ash, and media (sand or olivine) stream is fed to the bubbling fluidized bed char combustor in order to regenerate and reheat the fluidization media.

Note, another type of combustor such as a circulating fluidized bed char combustor may be used. Also, another type of reactor may be used in the first stage such as a bubbling fluidized bed reactor, a radiant thermal reactor, a circulating fluidized bed reformer with a straight riser, or a fast-fluidized bed with a riser on top. Note, in an embodiment olivine is used as at least a portion of the heat absorbing media. The olivine material (specifically the Magnesium Oxide (MgO) in olivine) as heat absorbing media is for beneficial binding potassium out of the reaction products and minimizing clinker formation.

Note, tail/waste gases from other parts of the integrated plant, including methane from a downstream methanol stage if used, may be routed in a loop to the char combustor and used as supplemental fuel in the combustor to heat the heat absorbing media. The char and fuel gases are combusted to heat the heat absorbing media. Natural gas may be used as supplemental fuel in the combustor to provide the balance of gasification heat required. The combustor is operated at gas velocities that allow the smaller/lighter ash particles to be separated from the sand or olivine, and recovered in flue gas solids removal systems (downstream of the recycle combustor cyclone). Hot, regenerated sand or olivine is returned to the gasifier/circulating fluidized bed reactor via an L-valve.

In an embodiment of the circulating fluidized bed version of the combustor, a recycle cyclone is coupled to the char combustor and is configured to operate at less than maximal efficiency from as low as 75% and no higher than 99%. This is to ensure that a bulk of the heat absorbing media is returned to the char combustor but will allow the lighter ash particles to escape to the recycle cyclone where the ash particles are removed from the integrated plant. The recycle cyclone is the primary mode of exit for ash from the system (as well as attrited fines from the circulating media). The cyclone separator is a low efficiency cyclone separator that separates two solids such as the heavier circulation medium, such as sand or olivine, from the lighter particles of ash. In an embodiment of the bubbling fluidized bed version of the combustor, the cyclone will be extremely high efficiency—greater than 99.99%.

For the circulating fluid media loop with stage 1 of the BRR and the char combustor, the design may use properly designed devices such as L-valves and loop seals to ensure a desired circulation rate with safe operation.

The heat absorbing circulating media could be silica-based sand, olivine, ilmenite, or mixtures thereof. The integrated plant may also put in other additives with the circulating media such as catalysts (to reduce the tar and other heavy hydrocarbon yield, increase approach to water-gas shift equilibrium, sulfur getters, and other additives to raise the melting points of the ash and media).

FIG. 3 illustrates a diagram of an embodiment of the circulating fluidized bed reactor having multiple sections that form a shape and an operation of the circulating fluidized bed reactor.

The circulating fluidized bed reactor has multiple sections 314-320 forming a shape and an operation of the circulating fluidized bed reactor. The circulating fluidized bed reactor may have a bottom section 314 and a mixing pot section 316 of the vessel that are cylindrical in shape. The mixing pot section 316 then comes up to a necking portion 318 of the vessel that is smaller in diameter than the mixing pot section 316. The necking portion 318 then goes to a top riser section 320, which includes the reactor output of the first stage, of the circulating fluidized bed reactor. The bottom section 314 has the sparger to distribute high-temperature and high-pressure steam in the circulating fluidized bed reactor. The sparger supplying steam is located at or near the bottom section 314 of the vessel.

The bottom section 314 of the vessel and the mixing pot section 316 of the vessel have width dimensions that are substantially greater than a circumference of the riser section 320. The circulating fluidized bed has different velocities flowing through the vessel in the multiple sections, which causes turbulence for the biomass flowing with the circulating solid media. The sparger at the section 314 of the vessel injects high-pressure steam at a velocity of about 2 feet/second and the high-pressure steam is between 50 to 300 pounds per square inch.

The supply inputs to feed biomass are located in the mixing pot section 316 to feed the biomass toward the bottom of the vessel, where the biomass is mixed with superheated fluidization gases and heat absorbing media. The feed point of the supply inputs to feed biomass is far enough from the bottom section 314 of the vessel to ensure the biomass readily falls from the supply inputs into the vessel from a great enough height that the biomass cannot get close to physically building up from the bottom to block the entering biomass; and thus, a location of the feed point of the supply inputs in the vessel eliminates a need to have a seal in the supply inputs against solid biomass back flow. The design may have at least 3 foot drop on the gas feed line to taps/aeration points and also the gasifier/reactor and the char combustor plenums. This 3 foot rise is a very effective seal against solid back flow. This drop and rise varies with specific size and geometry of vessel.

The circulating fluidized bed reactor/biomass gasifier may be lined with refractory materials of both soft and hard refractory materials such as 2 inches of soft refractory insulation and 2 inches of hard refractory insulation. In an embodiment, the thickness of the hard face refractory insulation is adjusted to fit into nominal pipe and vessel size requirements. In another embodiment, what governs the refractory thickness and fit is the need to control temperature of the chosen metallurgy, erosion and chemical resistance of the refractory, etc.

Figure 4:
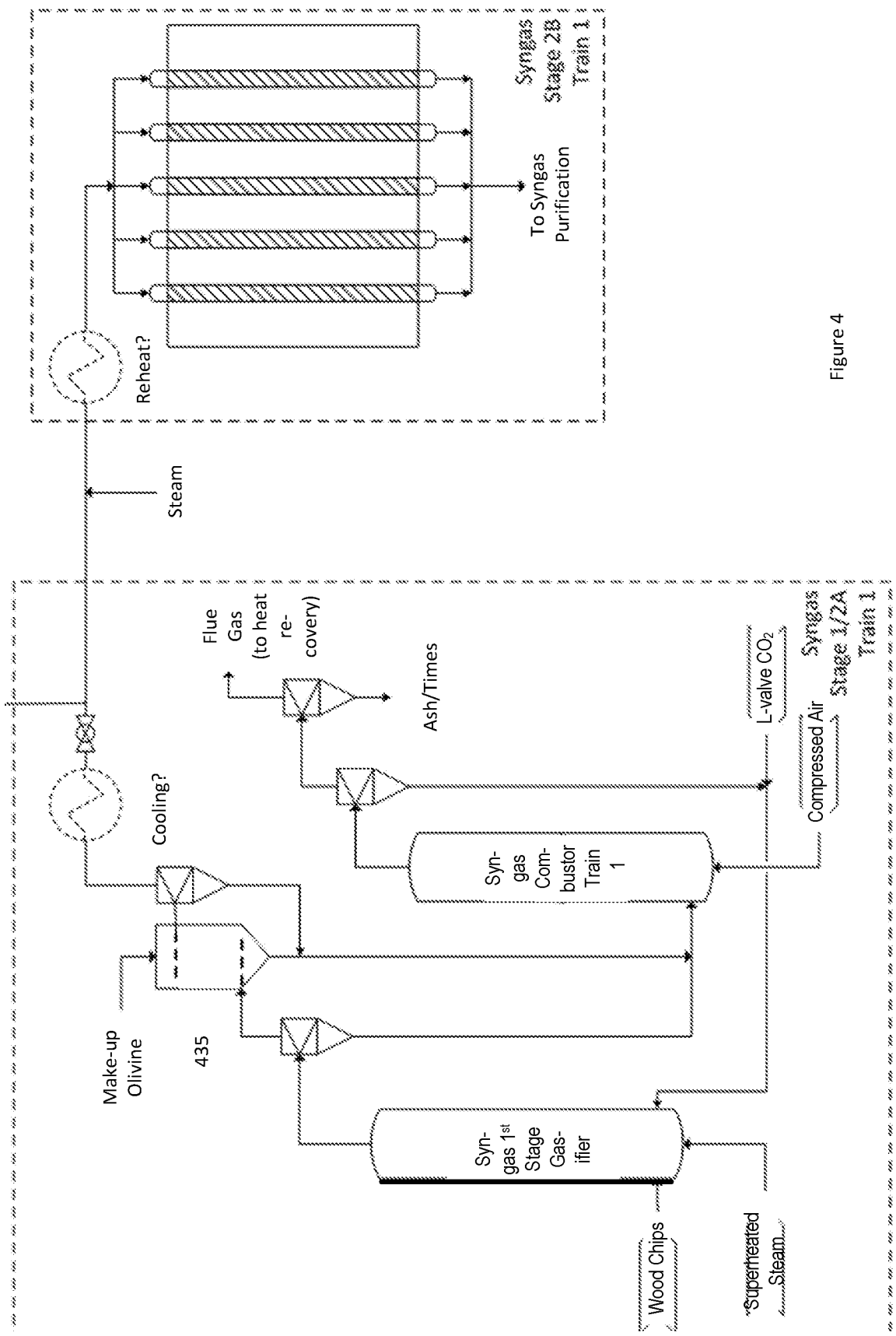
FIG. 4 illustrates a diagram of an embodiment of a densely packed moving bed coupled to the reactor in the first stage via the primary cyclone.

FIG. 4 illustrates a diagram of an embodiment of a densely packed moving bed coupled to the reactor in the first stage via the primary cyclone.

The densely packed moving bed 435 may be made of olivine, ilmenite, or dolomite that is similar in composition to circulating heat absorbing media. The densely packed moving bed 435 is configured to act as both a dust filter and a tar destroyer from the raw syngas stream coming out from the reactor output of the first stage. The densely packed moving bed 435 is coupled to a gaseous output of the primary cyclone coupled to the reactor output of the first stage. The tar destruction bed could operate adiabatically at 900 C (temperature could drop to 800-850 C) or isothermally with a mechanism for heating the bed—e.g. via a furnace or some oxygen addition. In an embodiment, the moving bed 435 is configured to operate adiabatically at 800 C to 950 C temperature. Tars heavier than benzene are chemically broken down into constituent gases in the raw syngas in the densely packed moving bed 435 in order to protect any downstream components from coating with soot.

In general, olivine is active for tar conversion at the decomposition and decomposition conditions present. Olivine is generally used in the gasifier as heat absorbing media, due to its attrition resistance; however, it can also be applied separately downstream of the gasifier in the moving packed bed form as a guard bed/tar converter. Olivine performance for tar cracking activities can be very effective at these conditions. Regeneration of the Olivine packed moving bed 435 is accomplished by flowing the moving packed bed of Olivine with its collected dust and heavy tar residue into the packed bed of olivine and then into the char combustor to be joined and heated with the rest of the circulating olivine in the char combustor. In an embodiment, conversions—tars (heavier than benzene) may be 25-65%; benzene conversion may be 90%; light hydrocarbons conversion may be 0%; and methane conversion in the raw syngas may be 0%. Thus, the hot packed slow moving bed 435 of olivine is operated at about 900 degrees C. to chemically break down the heavy sooting tars, such as polyaromatic hydrocarbons tars, in the raw syngas from the gasifier/reactor in the first stage. The hot packed slow moving bed 435 of olivine, acts as a tar pre-reformer to substantially breaks down the heavy sooting tars to protect the downstream components from coating with soot.

Note, in order not to fluidize the moving bed, the apparent weight of the bed must exceed the pressure drop through the bed. Using an average olivine particle diameter of 550 microns, a GHSV (active bed length) of 3,000 v/v/hr, and an L/D of 0.385 ft/ft, a pressure drop of 4.1 pounds per square inch is estimated. Therefore, in an embodiment, a minimum densely packed bed level of seven feet (ft) is required above the outlet gas collector in order to keep the densely packed moving bed 435 from fluidizing.

In an embodiment, the moving bed may draw circulating media from the char combustor to act as the feed source for the densely packed bed and could be fed by a loop to the make-up insertion input into the moving bed.

In an embodiment, once the syngas has been processed to remove a substantial amount of heavy tars in the integrated plant, and then the syngas will be sent to the stage 2 system for destruction of the remaining tars and conversion of a substantial amount of the methane to synthesis gas in a catalytic reactor. This catalytic reactor may be packed with supported metal catalysts active for methane reforming and tar destruction. Typical metal catalysts include nickel oxide, precious metals, etc. as catalysts. In an embodiment, the catalytic reactor in the second stage may operate at 850-900 C and have multiple tubes, each with the catalyst inside the vessel of the reactor while gas fired heaters supply heat for the chemical reactions inside the tubes. The reactor may be co-fed with sufficient superheated steam to increase the steam:carbon ratio of the catalytic reactor feed to, for example, 8 mol/mol. The syngas with light tars and methane enters the tubes with the catalyst and then this reforms the light hydrocarbons in their constituent molecules of $H_2$, CO, $CO_2$, etc.

The catalytic reactor in the second stage may operate at GHSV's ranging from 1000-20,000 inverse hours, most preferably in the 2,000-7,000 range. The temperature of operation would be 700-1000 C, most likely in the 800-900 C range. The exact operating conditions would be a function of desired conversion, feed properties, and catalyst life. The tubular reactor system is installed in a fired furnace not unlike a Steam Methane Reformer furnace or ethylene furnace. The catalyst will require regeneration on some frequency to maintain activity. The regeneration is effected by mild oxidation of the carbon deposited on the catalyst, although steam or hydrogen regeneration in a reducing atmosphere can also be practiced.

The second stage of the BRR reduces the tars by cracking the tars out of the gas stream and does use a catalyst. The second stage reduces the methane percentage by steam-reforming the methane into smaller molecules such as CO, $CO_2$, and $H_2$. The resultant chemical grade synthesis gas will be substantially tar-free (less than 100 ppm total tars including benzene and naphthalene and more likely less than 5 ppm) with methane content as low as 2% (dry basis) and certainly no higher than 10%.

The output of the second stage is sent to a syngas cleanup section to remove additional trace contaminants from the syngas, such as sulfur, water, and potassium, and other trace contaminants before sending the chemical grade syngas to downstream chemical processes, selected from a methanol synthesis reactor, a Methanol to Gasoline reactor train process, a high temperature Fischer-Tropsch reactor train, or another chemical process that uses the reaction syngas product derived from biomass in the bio-reforming reactor.

In an embodiment, a tubular reactor with an operating temperature over 1100 degrees C. can substantially crack all of the tars and methane without a catalyst. A tubular reactor with lower operating temperatures can also crack these molecules with the assist of a catalyst.

As part of the plant integration, some of the raw syngas may bypass the Stage 2 catalytic reformer so as to maintain a high calorific value as use for fuel gas in the rest of the plant. This will especially be true for those cases requiring higher greenhouse gas reduction or for those where natural gas is not readily available at reasonable cost. This fuel gas could be used for generating steam, firing furnaces, supplemental fuel to the char combustor, and other places where natural gas might typically be used. Also, beneficial carbon credits may be generated for using this raw syngas from the integrated plant over natural gas.

Referring back to FIG. 1, the integrated plant may have a biomass feed supply system, an interconnected set of two or more stages of reactors 101, 103 to form a bio-reforming reactor, a gas clean up section, a steam methane reformer in parallel with bio-reforming reactor, and any of a methanol synthesis reactor, a Methanol to Gasoline reactor train process, a high temperature Fischer-Tropsch reactor train, or another chemical process that uses the reaction syngas product derived from the decomposition in the bio-reforming reactor and syngas from the steam methane reformer.

In the biomass feed supply system, the biomass may be stored as chips. The conveyor may bring the chips of biomass over to a filter/screen that make sure that the chip size is within limits, such as underneath 2 inches of length of chip of biomass. After the screening of the chip size, the biomass chips may be fed to a size reduction step such as a Hammermill. The Hammermill may then feed the chips to second screen to make sure that the chip size is within limits, such as underneath ¾ inches of length of chip of biomass. A conveyor may bring the chips through the second screen to either 1) a chip dryer or 2) to a biomass pre-treatment process to make small fine particles of biomass, such as a steam explosion process. Chips going to the biomass pre-treatment process such as a steam explosion process are turned into fine moist particles of biomass magnitudes smaller in size than the chips. The moist fine moist particles of biomass go to a dryer system and become biomass in a dried powered form. The dried powdered form of biomass may be stored in a silo. The biomass may be stored as chips.

The moisture content of the biomass can range from say 3-5% to as high as 35%. The integrated plant may have drying options that can include flash dryers, rotary drum dryers, or belt dryers. The integrated plant may dry in a low oxygen atmosphere for safety reasons including prevention of fires as well as inert gases from other parts of the process can be re-used and integrated as a supply into the dryers.

The biomass maybe fed to a lock hopper, where an entrainment feed gas system feeds the dried biomass into a circulating fluidized bed bioreactor. Alternatively, the chips of biomass in their slightly wet form also may go through a biomass chip dryer system and then be stored as half-inch to three-quarter inch chips of biomass in a silo tank. The chips of biomass are then fed through a conveyor to a chip lock hopper and feed system into the circulating fluidized bed bio reformer in the first stage 101.

The circulating fluidized bed bio reformer produces the raw syngas and other reaction products sent to the cyclone and moving bed in the outlet of the first stage 101. The gases from the first cyclone may be fed to one of three pathways. The first potential pathway is through a catalytic reactor second stage system 103. The second potential pathway is through a thermal reactor second stage system 103. The thermal second stage system that operates a higher temperature may be a radiant heat reactor. The pathway through the thermal reactor does not need to use a catalyst but rather operates at a higher temperature.

In any of the possible stage 2 reactors, the second stage reduces the methane percentage by steam-reforming the methane into smaller molecules such as CO, $CO_2$, and $H_2$. The second stage of the BRR reduces the tars by cracking the light tars and virtually all of the heavy tars out of the chemical grade syngas stream. The chemical grade syngas stream from the second stage is sent to a syngas cleanup section to remove additional contaminants from the syngas, such as sulfur, water, and potassium, and other contaminants before sending the chemical grade syngas to downstream chemical processes.

The integrated plant includes the multiple stage bio-reforming reactor that generates a chemical grade syngas that is supplied to a transportation fuel back-end such as gasoline or high temperature Fischer Tropsch fuel products. The integrated plant receives raw biomass such as pine wood and converts the biomass into the transportation fuel. The integrated plant may use diverse biomass feedstocks and feedstock preparation methods (including chip size and powder size). The integrated plant may have a flexible configuration to feed reaction products (of both natural gas and biomass, or biomass only fed into the bio-reforming reactor) to meet regional requirements and to maximize economics.

In an embodiment, the two or more stages, such as the 1st stage and 2nd stage, forming the bio-reforming reactor converts the solid biomass from the chunk or particle preparation step into gaseous reactants including $CH_4$, $H_2$, $CO_2$, & CO. The syngas produced by the bio-reforming reactor can be low in carbon dioxide because by design a substantially stoichiometric amount of steam is supplied into the reactor and no additional oxygen is supplied as a reactant or fuel to drive the reaction in the decomposition reaction. Thus, a very low amount of oxygen is present and the decomposition reaction produces mainly CO rather than $CO_2$. The syngas from the biomass reforming reactor is also low in nitrogen, low in ammonia, low in sulfur content, and low in hydrogen cyanide (HCN). For example, the sulfur content of the syngas gas coming out of the bio-reforming reactor is barely over one part per million after the clean-up steps. In an embodiment, right out of the bio reforming reactor itself, the syngas stream could contain sulfur as high as 50 ppm; and the same is true for other constituents such as HCN, $NH_3$, etc. The woodchips used to produce the particles of biomass generally have a low sulfur content. Barely trace amounts of HCN, ammonia, are generated and trace amounts of nitrogen are present making the syngas virtually free of nitrogen, ammonia, and HCN, in the syngas stream coming out of the bio-reforming reactor. In contrast, syngas from coal contains high quantities of sulfur, amine, and HCN. Accordingly, the syngas cleanup components downstream of the bio-reforming reactor can be less inclusive and exclude some of the gas cleanup components needed for other biomass syngas producers, such as a coal-based syngas. Thus, compared to a coal-based syngas, an ammonia removal plant is not needed, a HCN removal plant is not needed, a nitrogen purge is not needed, and merely either the bulk sulfur removal or a sulfur guard bed is needed but not both. The lack of having to put multiple contaminant removal steps into the gas cleanup portion of the integrated plant reduces both capital expenses for constructing and installing in that equipment as well as reducing operating expenses for having to operate the additional gas removal equipment and replace their catalysts/filters to remove the contaminants from the syngas stream.

The syngas stream from the decomposition coming out of the bio-reforming reactor may have a 1.1:1 or a 1.2:1 hydrogen to carbon monoxide ratio. A ratio controller with sensors located at the input of the high temperature Fischer-Tropsch train will control the hydrogen to carbon monoxide ratio of syngas going into the Fischer-Tropsch train. The ratio will be about 1.5:1 to 2.0:1 hydrogen to carbon monoxide controlled by the controller and measured by hydrogen and carbon monoxide sensors at that input. In an embodiment, H2:CO ratios of 1.8:1 to as high as 2.1:1 are in the syngas stream because of the steam in the process and the amount of water gas shift that goes on. The downside is that too much CO2 may be made for the Fischer-Tropsch train and some CO2 removal may be inline or an additive may be added in the reactor process itself. However, the syngas to Methanol (MEOH) train does not mind CO2 since it is a chemical reactant in this process. Sensors can also be located at the output of the bio-reforming reactor as well as the steam methane reforming reactor to have a ratio control system to know what the molarity of the syngas being supplied by each of these reactors is in order to know the proper volumes to mix to get the end result of having a combined syngas from the steam methane reforming reactor and the bio-reforming reactor between, for example, the range of 1.5:1 and 2.0:1. The ratio control system will also send feedback to both the bio-reforming reactor and the steam methane reforming reactor in order to control the volume of syngas being produced by both of those reactors.

FIGS. 5A-5C illustrate flow diagrams of an embodiment of a bio-reforming reactor configured to generate chemicals, such as chemical grade syngas and liquid transportation fuels, in an integrated plant. The steps may be performed in any order where logically possible and not all of the steps must be performed.

In step 502, the bio-reforming reactor is formed with an interconnected set of two or more stages of reactors that generate syngas for any of 1) a methanol synthesis reactor, 2) a Methanol to Gasoline reactor train process, 3) a high temperature Fischer-Tropsch reactor train, or other chemical process that uses the syngas derived from biomass in the bio-reforming reactor. A first stage may include a circulating fluidized bed reactor that has one or more stream inputs to feed heat absorbing media, including silica sand, ilmenite, olivine, and any combination of the three, a vessel to circulate the heat absorbing media, one or more supply inputs to feed the biomass, and has a sparger to input steam.

In step 504, the first stage of the bio-reforming reactor causes a chemical devolatilization of the biomass into its reaction products of constituent gases, tars, chars, and other components, which exit through a reactor output from the first stage.

In step 506, the first stage circulating fluidized bed has different velocities flowing through the vessel in multiple sections making up the circulating fluidized bed reactor, which causes turbulence for the biomass flowing with the circulating solid media.

In step 508, the first stage injects high-pressure steam at a velocity of about 2 feet/second and the high-pressure steam is between 50 to 300 PSI with the sparger at a bottom of the vessel.

In step 510, the steam from the sparger, superheated fluidization gases, and a stream of the heat absorbing media from the one or more stream inputs both gasify and push up falling chunks and particles of the biomass upward in the vessel. The high temperature and high-pressure of the steam and the heat absorbing media starts the devolatizing of the biomass, which causes localized turbulent flow of gases around each biomass chunk.

In step 512, the first stage has an example velocity flow of the biomass in the mixing pot section between 2-6 feet/second in the circulating fluidized bed reactor based on a shape and dimensions of the vessel. The velocity flow of the biomass and its devolatilized gases and solids at a start of the necking transition section is up to 5-10 feet per second based on the shape and dimensions of the vessel in this section, and where the velocity flow of the biomass and its devolatilized gases and solids at an exit of the riser section is greater than 15 feet per second based on the shape and dimensions of the vessel in this section.

In step 514, the first stage has the circulating fluidized bed reactor has multiple sections forming a shape and an operation of the circulating fluidized bed reactor. The circulating fluidized bed gasifier has the sparger to distribute high-temperature and high-pressure steam in a bottom section of the circulating fluidized bed reactor. The circulating fluidized bed reactor is configured to operate in a temperature regime from 750 C to 1000 C and an operating pressure is configured to be from 20 psig up to 300 psig. In another example, superficial gas velocities in a top riser section are configured to be greater than 19 feet/second based on a shape and dimensions in this section of the vessel while the velocities in a mixing pot section will range from 2-6 feet/second based on a shape and dimensions in this section of the vessel. The mixing pot section can be located between the bottom section and top riser section. The steam from any of the sparger, the stream inputs for the heat absorbing media, and the supply inputs for the biomass combine to reform the biomass at total steam to biomass ratio ranging from 0.25:1 up to 1:1.

In step 516, the angular necking section of the circulating fluidized bed reactor reflects and turns some of the heat absorbing media, gases, and not fully-decomposed solid biomass on outside edges of the necking section back down into the circulating fluidized bed in the mixing pot section, which causes more turbulence as well as a better distribution of the biomass inside the vessel. The angle of the necking section from the mixing pot section to the riser section controls an amount of turbulence with the reflected back heat absorbing media, gases, and not fully decomposed solid biomass into the mixing pot section portion of the vessel. The internal portion of the vessel has one or more additional internal mixing baffles to assist with mixing of the heat absorbing media and biomass.

In step 518, the first stage receives the raw syngas stream in a primary cyclone coupled the reactor output from the first stage in a riser section of the circulating fluidized bed reactor. The primary cyclone is heavily loaded to operate at very high solids recovery efficiency in excess of 99%. The primary cyclone that is very efficient in separating solid particles including char and the solid circulating heat absorbing media routes the solid particles toward the char combustor, and routes gases from the stream of the reaction products toward the input of the second stage of the bio-reforming reactor.

In step 520, the first stage receives the raw syngas stream in a densely packed moving bed of olivine or dolomite, which is configured to act as both a dust filter and a tar destroyer from the raw syngas from the reactor output of the first stage. The densely packed moving bed is coupled to a gaseous output of a primary cyclone, which is coupled to the reactor output of the first stage. The moving bed is configured to operate adiabatically at 800 C to 950 C temperature. Tars heavier than benzene are chemically broken down into constituent gas in the raw syngas in order to protect any downstream components from coating with soot.

In step 522, the second stage of the bio-reforming reactor receives a stream of the reaction products that includes the constituent gases and at least some of the tars as raw syngas. The second stage of the bio-reforming reactor then, chemically reacts the raw syngas within a vessel of the second stage to make the raw syngas from the first stage into a chemical grade syngas by further cracking the tars, excess methane, or both into their constituent molecules so that a resultant syngas stream going out a reactor output of the second stage can be used in other chemical reactions rather than just being a source of fuel for burning.

In step 524, the second stage of the bio-reforming reactor receives the raw syngas stream in a catalytic reactor to remove a substantial amount of tars and methane remaining in the raw syngas. The catalytic reactor reacts with the raw syngas to create a resultant chemical grade synthesis gas that is substantially tar-free, less than 5 ppm total tars including benzene and naphthalene, and with a methane content no higher than 2% (dry basis).

In step 526, the downstream integrated plant production components receive the generated chemical grade syngas derived from biomass in the bio-reforming reactor for use in any of 1) a methanol synthesis reactor, 2) a Methanol to Gasoline reactor train process, 3) a high temperature Fischer-Tropsch reactor train, or 4) other Chemical production process.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. A method to generate chemical grade syngas in an integrated plant, comprising:
forming a bio-reforming reactor with an interconnected set of two or more stages of reactors that generate and supply syngas for at least one of 1) a methanol synthesis reactor, 2) a Methanol to Gasoline reactor train process, 3) a high temperature Fischer-Tropsch reactor train in the integrated plant, that use the syngas derived from chunks of woods or other lignocellulosic biomass in the bio-reforming reactor, where each stage of the two or more stages includes at least one reactor;
where a first stage includes a circulating fluidized bed reactor that has one or more stream inputs to feed heat absorbing media, where the heat absorbing media is selected from the group consisting of silica sand, ilmenite, olivine, dolomite, zeolite catalysts and any combination of the five, a vessel to circulate the heat absorbing media, one or more supply inputs to feed the biomass, and has a sparger to input steam, where the heat absorbing media is filtered out from the syngas leaving the circulating fluidized bed reactor with a cyclone filter and then recycled into the circulating fluidized bed reactor, where the cyclone filter is configured to operate at less than maximal efficiency from as low as 75% and no higher than 99%, where this is to ensure that a bulk of the heat absorbing media is returned to the char combustor but will allow lighter ash particles and gas to escape;
supplying the chunks of woods or other lignocellulosic biomass, which average greater than ½ inch in size into the circulating fluidized bed reactor, where a shape of the circulating fluidized bed reactor and a velocity flow of the biomass set in the circulating fluidized bed reactor are based on using the chunks of woods or other lignocellulosic biomass;
causing, in the first stage, a chemical devolatilization of the biomass into the biomass's reaction products of constituent gases, tars, chars, and other components, which exit through a reactor output from the first stage;
receiving a stream of the reaction products that includes the constituent gases and at least some of the tars as raw syngas in a second stage of the bio-reforming reactor; and
then, chemically reacting the raw syngas within a vessel of the second stage to make the raw syngas from the first stage into the chemical grade syngas by further cracking the tars, excess methane, or both into their constituent molecules so that a resultant syngas stream going out a reactor output of the second stage is supplied to and used in chemical reactions for the at least one of the 1) methanol synthesis reactor, 2) Methanol to Gasoline reactor train process, and 3) high temperature Fischer-Tropsch reactor train, which makes up a downstream component in the integrated plant; rather than, just being a source of fuel for burning, where the at least one of the 1) methanol synthesis reactor, 2) Methanol to Gasoline reactor train process, and/or 3) high temperature Fischer-Tropsch reactor train actually uses the chemical grade syngas, derived from the chunks of woods or other lignocellulosic biomass in the bio-reforming reactor, in chemical reactions in their chemical processes rather than just being the source of fuel for burning.

2. The method of claim 1, where the circulating fluidized bed has different velocities flowing through the vessel in multiple sections making up the circulating fluidized bed reactor, which causes turbulence for the biomass flowing with the circulating solid media; and
injecting high-pressure steam at a velocity of about 2 feet/second and the high-pressure steam is between 50 to 300 PSI with the sparger at a bottom section of the vessel.

3. The method of claim 1, where the steam from the sparger, superheated fluidization gases, and a stream of the heat absorbing media from the one or more stream inputs both gasify and push up falling chunks and particles of the biomass upward in the vessel, where the high temperature and high-pressure of the steam and the heat absorbing media starts the decomposing of the biomass, which causes localized turbulent flow of gases around each biomass chunk, where the velocity flow of the biomass in a mixing pot section is between 2-6 feet/second in the circulating fluidized bed reactor based on a shape and dimensions of the vessel, where the velocity flow of the biomass and the biomass' decomposed gases and solids at a start of a necking transition section is up to 10 feet per second based on the shape and dimensions of the vessel in this section, and where the velocity flow of the biomass and its decomposed gases and solids at an exit of the riser section is greater than 15 feet per second based on the shape and dimensions of the vessel in this section.

4. The method of claim 1, where the angular necking section of the circulating fluidized bed reactor reflects and turns some of the heat absorbing media, gases, and not fully-decomposed solid biomass on outside edges of the necking section back down into the circulating fluidized bed in a mixing pot section, which causes more turbulence as well as a better distribution of the biomass inside the vessel, where an angle of the necking section from the mixing pot section to the riser section controls an amount of turbulence with the reflected back heat absorbing media, gases, and not fully decomposed solid biomass into the mixing pot section portion of the vessel, and an internal portion of the vessel has one or more internal mixing baffles to assist with mixing of the heat absorbing media and biomass.

5. The method of claim 1, further comprising:

receiving the raw syngas stream in a primary cyclone coupled the reactor output from the first stage in a riser section of the circulating fluidized bed reactor, where the primary cyclone is heavily loaded to operate at very high solids recovery efficiency in excess of 99%, where the primary cyclone that is very efficient in separating solid particles including char and the solid circulating heat absorbing media routes the solid particles toward the char combustor, and routes gases from the stream of the reaction products toward the input of the second stage of the bio-reforming reactor.

6. The method of claim 1, further comprising:

receiving the raw syngas stream in a densely packed moving bed of olivine or dolomite, which is configured to act as both a dust filter and a tar destroyer from the raw syngas from the reactor output of the first stage, where the densely packed moving bed is coupled to a gaseous output of a primary cyclone, which is coupled to the reactor output of the first stage, where the moving bed is configured to operate adiabatically at 800 C to 950 C temperature, where tars heavier than benzene are chemically broken down into constituent gas in the raw syngas in order to protect any downstream components from coating with soot.

7. The method of claim 1, further comprising:

receiving the raw syngas stream in a catalytic reactor in the second stage to remove a substantial amount of tars and methane remaining in the raw syngas, where the catalytic reactor reacts with the raw syngas to create a resultant chemical grade synthesis gas that is substantially tar-free, less than 5 ppm total tars including benzene and naphthalene, and with a methane content no higher than 2% (dry basis).

* * * * *